(No Model.) 2 Sheets—Sheet 1.

L. G. ERICSON,
TAILOR'S MEASURING IMPLEMENT.

No. 465,252. Patented Dec. 15, 1891.

Witnesses
C. E. Ashley
H. W. Lloyd

Inventor
Leers G. Ericson
By his Attorney
Charles J. Kintner (No Model.) 2 Sheets—Sheet 2.

L. G. ERICSON.
TAILOR'S MEASURING IMPLEMENT.

No. 465,252. Patented Dec. 15, 1891.

UNITED STATES PATENT OFFICE.

LARS G. ERICSON, OF NEW YORK, N. Y.

TAILOR'S MEASURING IMPLEMENT.

SPECIFICATION forming part of Letters Patent No. 465,252, dated December 15, 1891.

Application filed July 14, 1891. Serial No. 399,468. (No model.)

*To all whom it may concern:*

Be it known that I, LARS G. ERICSON, a citizen of the United States, residing at New York, in the county and State of New York, have made a new and useful invention in Tailors' Measuring Implements, of which the following is a specification.

My invention is directed, particularly, to a novel form of measuring-instrument designed for use in connection with the body or chest measurement of a customer, and has for its object the construction of an instrument which shall enable a tailor to locate with absolute certainty the shoulder-points of a coat, vest, or analogous garment.

To this end it consists in the novel apparatus herein described, but particularly pointed out in the claims which follow this specification.

In order that my invention may be fully understood, reference is had to the accompanying drawings, in which—

Figure 3:
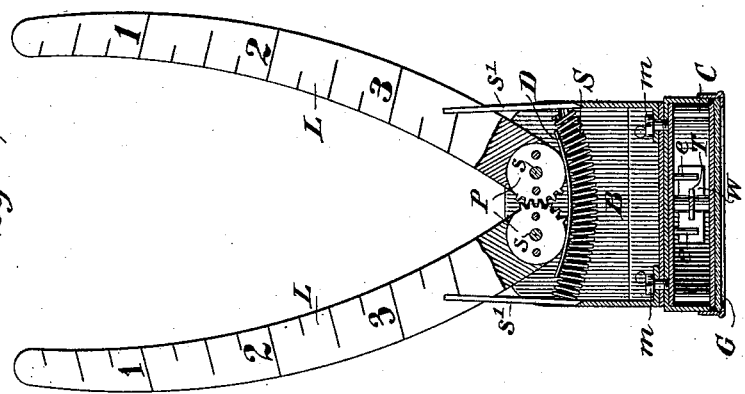
Figure 1:
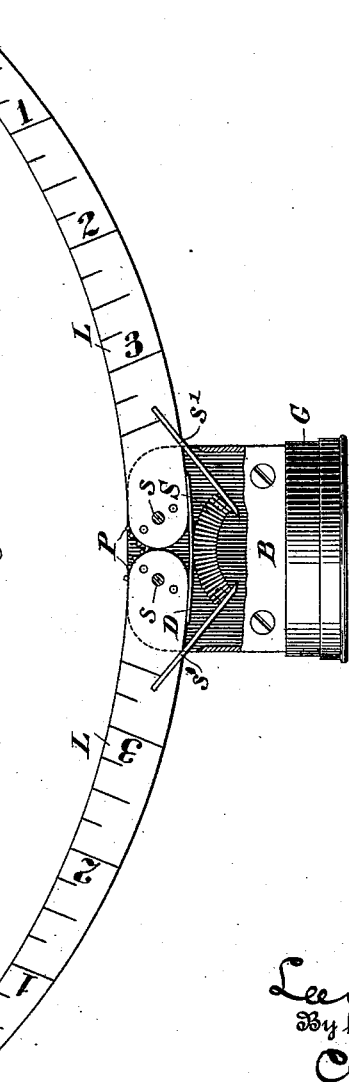
Figure 2:
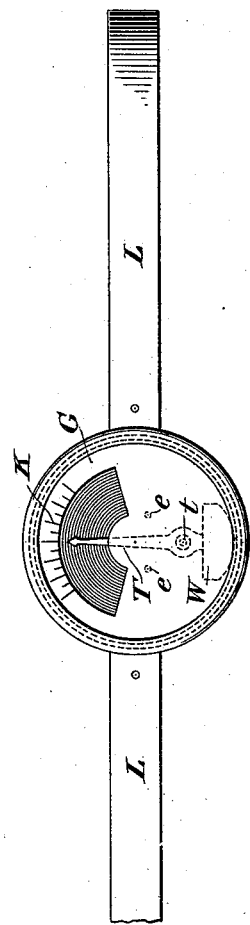
Figure 4:
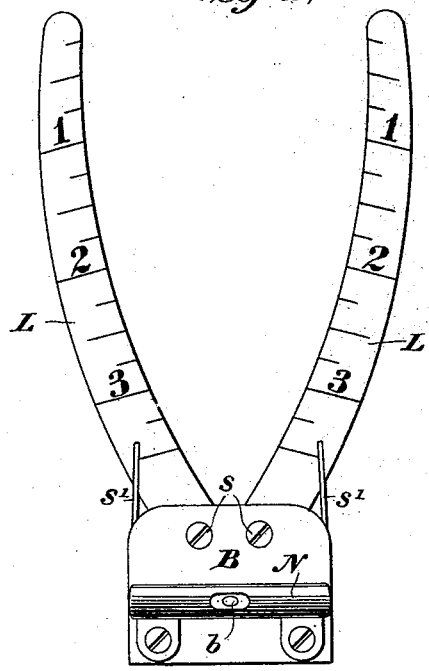
Figure 5:
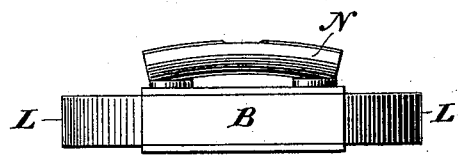

Figure 1 is a plan view of my improved apparatus in an extended position, showing the upper part of the casing broken away, the better to illustrate the interior mechanism thereof. Fig. 2 is an end elevational view as seen looking at Fig. 1 from the bottom toward the top of the drawing. Fig. 3 is a plan view of the apparatus in closed position, a section being taken through the casing to show more fully the operative portions thereof. Fig. 4 is a plan view of a modified form of the apparatus, and Fig. 5 is an end elevational view of Fig. 4 as seen looking from the bottom toward the top of the drawing.

In the manufacture of coats, vests, and analogous garments much difficulty is experienced by tailors in correctly locating what is known as the "shoulder-points" of the garment, and this is usually accomplished by the use of complex diagrams and various measurements with a tape or analogous measuring-instrument. I have discovered that these measurements may be simplified and accurately attained by making a correct measurement from points under the arms of the customer to points on the breast, which shall be on a horizontal line or level with each other, and afterward measuring from these breast-points so located to the shoulder-points between the neck and the tips of the shoulders. In order to accomplish this result, I have devised a novel apparatus, which gives me accurate measurements from the points under the arms to points on the breast and both on the same level, after which measurements are made from the aforesaid points on the breast to the shoulder-points; and it is this novel apparatus which constitutes the subject-matter of the present application.

Referring now to the drawings in detail, B represents the body of the apparatus, consisting, preferably, of a rectangular piece of metal having a removable cover. In the open end of this body-piece is pivoted a pair of curvilinear arms L, provided with measuring-scales upon their upper surfaces, as indicated, and a pair of intermeshing pinions P, the screws *s* constituting the pivots about which said arms are turned.

*s' s'* represent metallic arms fixed to the arms L and provided at their inner ends with lugs adapted to be inserted in the ends of a coil-spring S, and D is a yielding metallic spring resting loosely against the inner ends of the arms L and supporting the spring S in the position shown in Fig. 3. The parts D and *s'* are of substantially the same width as the depth of the case B, and when said parts are in position within the case the spiral spring S, acting by expansion, forces the lower ends of the parts *s'* into the position shown in Fig. 3, thereby causing the upper ends of the levers or arms L to assume a closed position. These levers L are of a curvilinear shape and are adapted by virtue of the action of the pinions P and spring S to fit the curvature of different-sized chests.

To the outer end of the case B is secured by screws *m* an indicating-level in a case G, said level consisting of an index-hand T, pivoted to the case at *t* and provided with a weight W on its lower end, K representing a scale to which the upper end of the index-hand T is adapted to point, and *e e* are pins limiting the throw of the index-hand in either direction.

In the modified form shown in Figs. 4 and 5 an equivalent leveling device is shown consisting of a slightly-curved tube N of glass or of such material as is usually utilized in leveling-instruments, said tube being attached to the case B and provided with an indicator filled with mercury, as shown, $b$ representing the level-bubble, the other portions of the apparatus being identical with those described in Figs. 1, 2, and 3 of the drawings.

I make use of the apparatus as follows: The customer is caused to stand as evenly on both feet as possible. The outer point of one of the arms L is placed slightly in advance of the armpit and the arms L forced apart until the curvature of the two conforms substantially to that of the customer's chest. At the same time the free end of the other arm or lever L is raised or lowered until the index-hand T points to the middle of the scale K. Measurement is then made on the scales from the point slightly in advance of the arm-pit to two individual points between that point and the center of the chest. These measurements are noted and the points marked on the customer's chest, after which measurement is made with a tape from these points to the shoulder-point between the neck and the tip of the shoulder. By this operation measurements are had upon a true horizontal section of the customer and to the shoulder-point, so that these exact measurements may be laid out upon the pattern or the cloth from which the garment is cut.

Having thus described my invention, what I claim, and desire to secure by Letters Patent of the United States, is—

1. A tailor's measuring-instrument consisting of a pair of curvilinear scales hinged together, in combination with a leveling-instrument, substantially as described.

2. A measuring-instrument composed of two curvilinear scales or arms hinged together, in combination with a leveling device attached to the instrument at a point near the junction of the two arms, substantially as described.

3. A measuring-instrument composed of a pair of curvilinear arms pivotally secured to a frame or support at their inner ends and provided with an elastic or yielding device adapted to vary their position, in combination with a leveling device, substantially as described.

4. A pair of curvilinear arms L, pivoted to a frame or support B and provided with intermeshing pinions P, and an elastic compression-spring S, in combination with a weighted pointer or indicator T and scale K, substantially as described.

LARS G. ERICSON.

Witnesses:
C. J. KINTNER,
M. L. BUTLER.